| United States Patent [19] | [11] | 4,076,061 |
|---|---|---|
| Greeninger | [45] | Feb. 28, 1978 |

[54] FIREPLACE WOOD CUTTING MACHINE

[76] Inventor: Carroll D. Greeninger, 7965 SE. 92nd St., Apt. No. 20, Portland, Oreg. 97266

[21] Appl. No.: 706,290

[22] Filed: Jul. 19, 1976

[51] Int. Cl.² .......................... A47J 42/09; B27L 7/00
[52] U.S. Cl. ............................... 144/3 K; 144/193 A; 144/193 E
[58] Field of Search ............... 254/104; 144/3 R, 1 R, 144/3 K, 193 R, 193 A, 193 E, 194, 3 D, 326

[56] References Cited

U.S. PATENT DOCUMENTS

| 885,458 | 4/1908 | Eckenroth | 144/193 A |
| 1,001,272 | 8/1911 | Howard | 144/3 K |
| 3,862,651 | 1/1975 | Heikkinen | 144/3 K |
| 3,974,867 | 8/1976 | Butas, Jr. | 144/193 A |

*Primary Examiner*—Othell M. Simpson
*Assistant Examiner*—W. D. Bray
*Attorney, Agent, or Firm*—Clarence A. O'Brien; Harvey B. Jacobson

[57] ABSTRACT

An elongated support frame is provided including inlet and outlet ends. The inlet end includes an inclined loading conveyor and a winch is supported by an upper portion of the frame and has a drag cable connected thereto for lengthwise winching logs toward the loading conveyor. Shear structure is supported from the frame adjacent the upper end of the loading conveyor whereby end portions of logs being advanced along the conveyor may be cut therefrom and an elongated trough is provided for receiving cut log end portions. One end of the trough includes stationary wedge structure and a power ram is provided for forcing cut log portions along the trough into engagement with the wedge structure, whereby the cut log portions may be split into multiple log sections. An inclined discharge conveyor is positioned to receive the multiple log sections from the wedge structure and is operative to elevate the logs to an elevated discharge end of the discharge conveyor for gravity discharge therefrom into a suitable receptacle.

16 Claims, 14 Drawing Figures

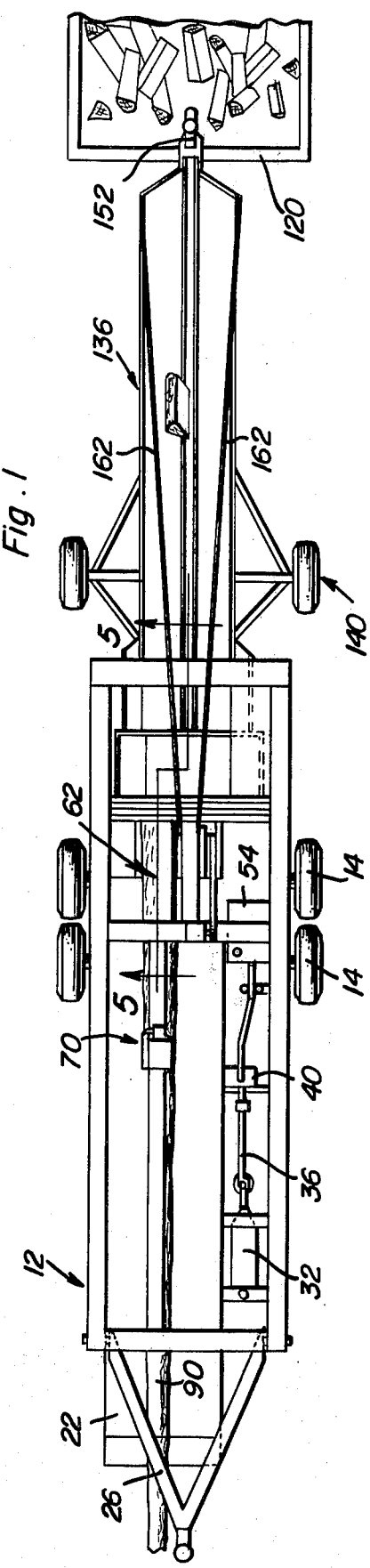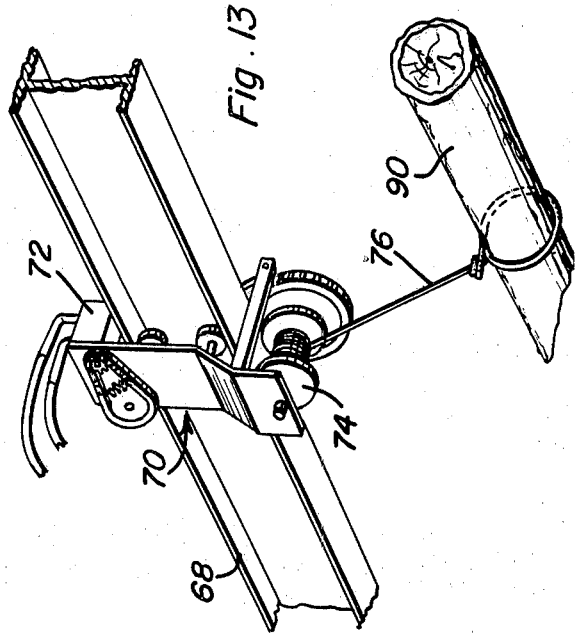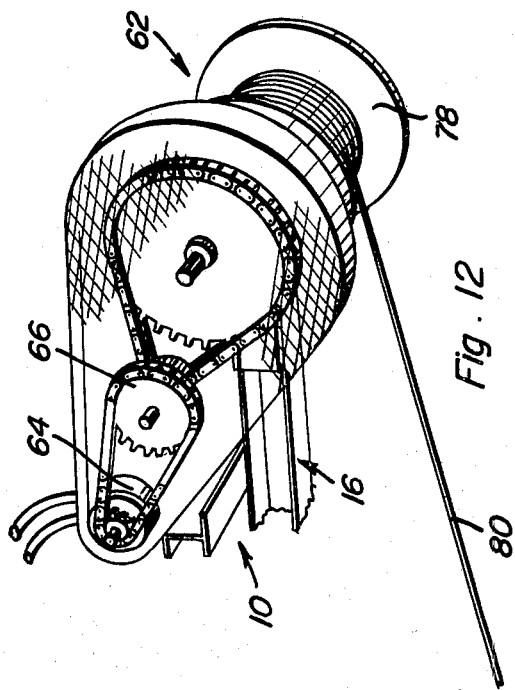

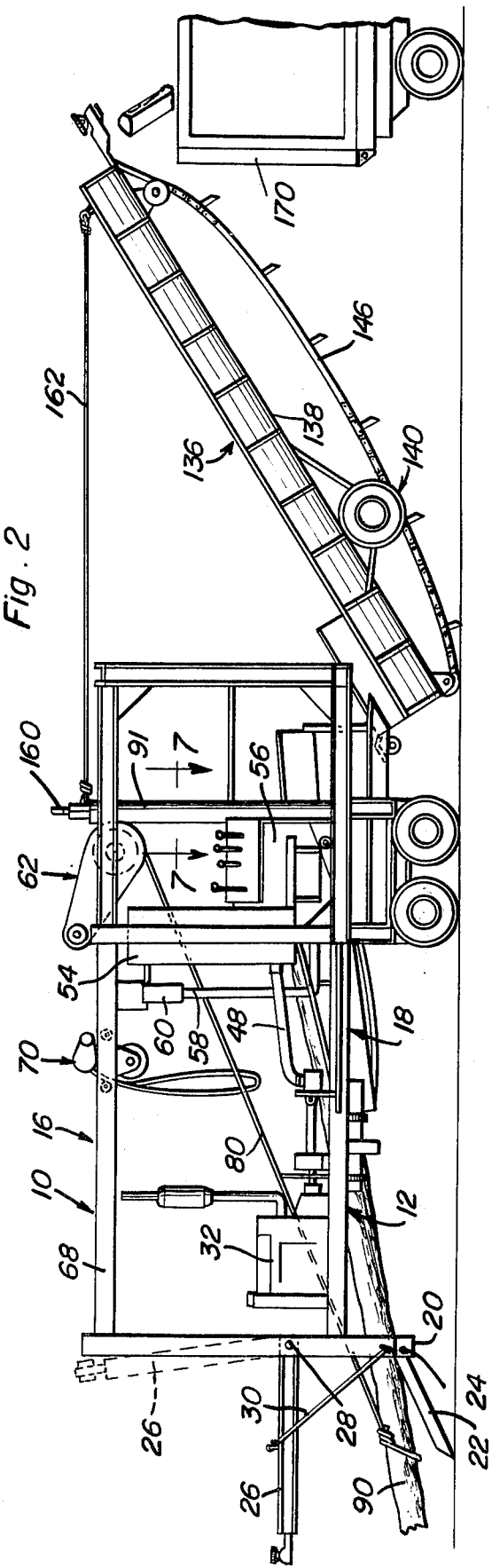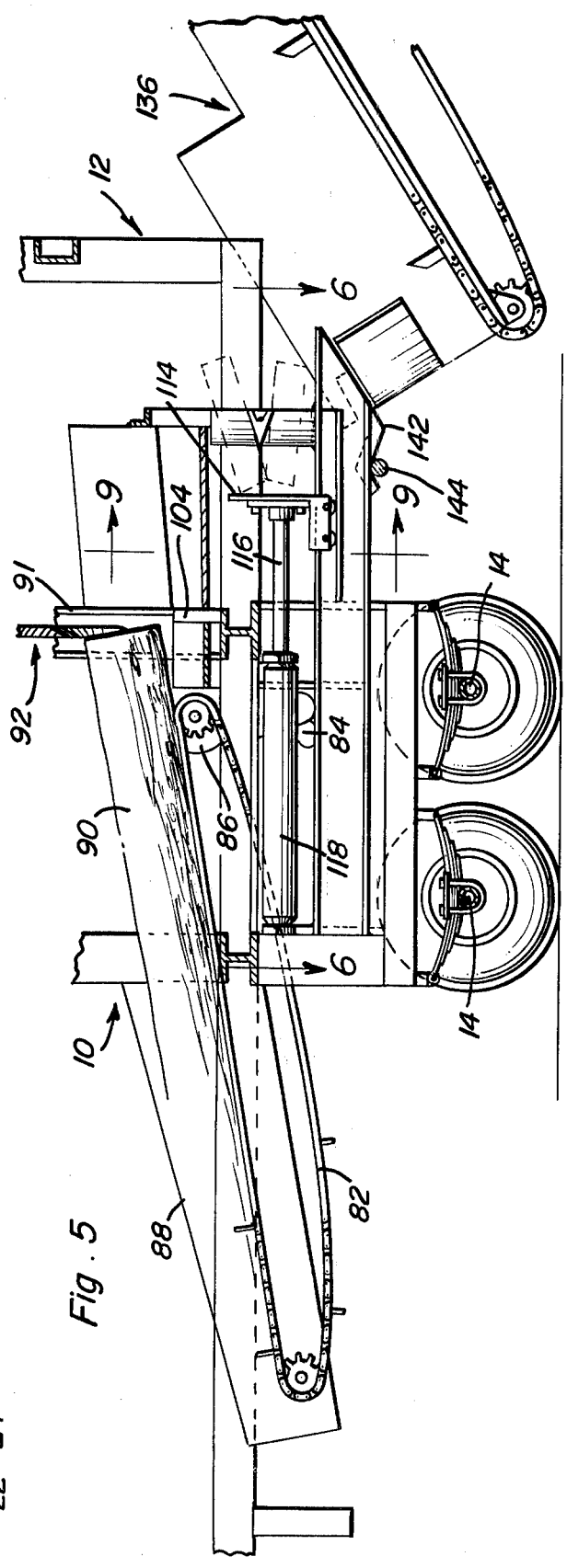

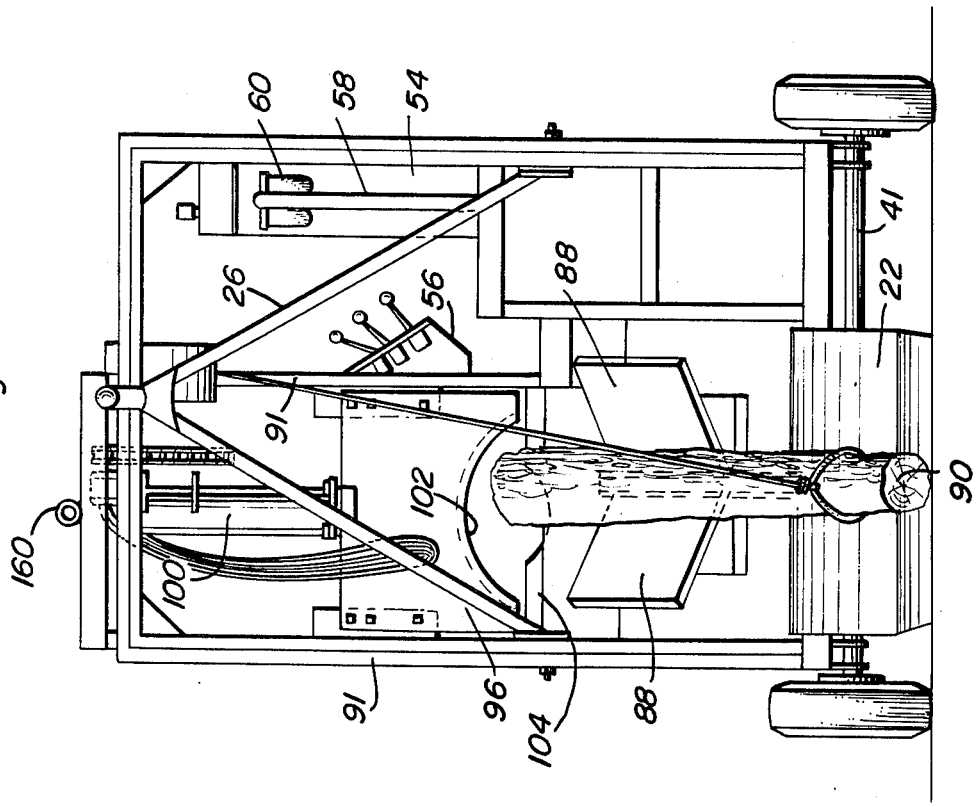
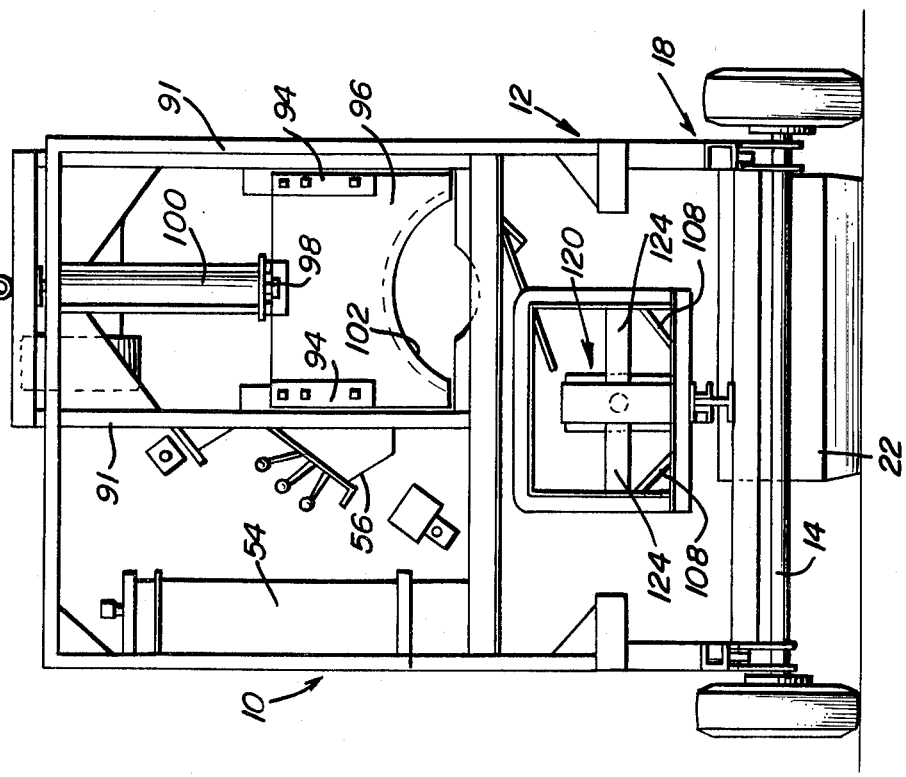

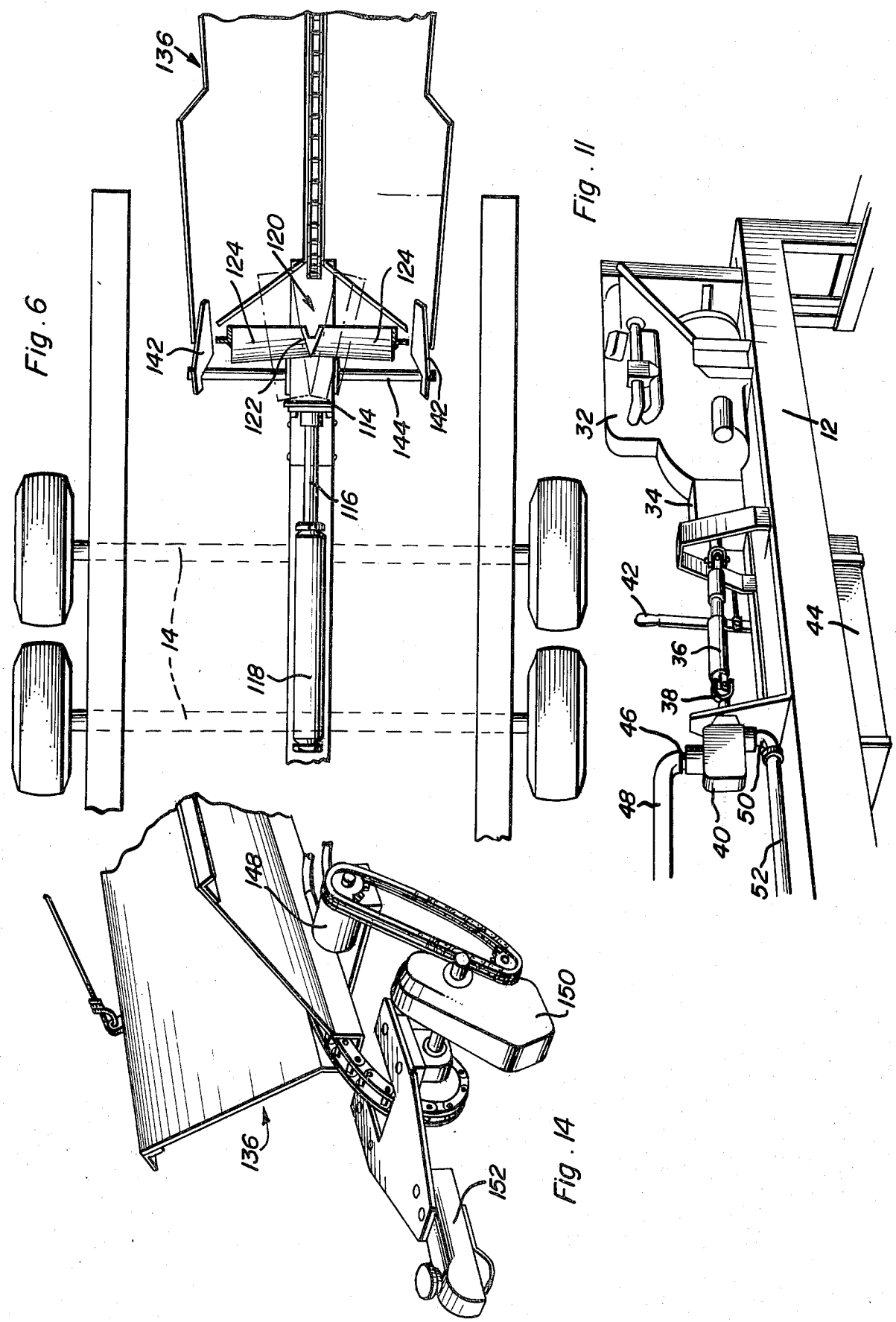

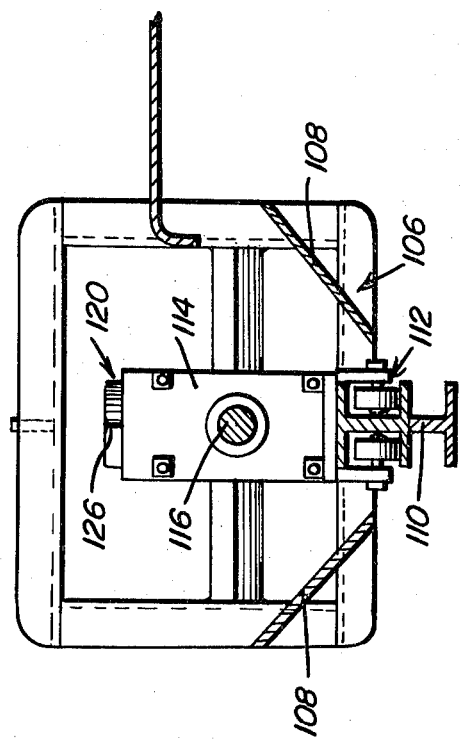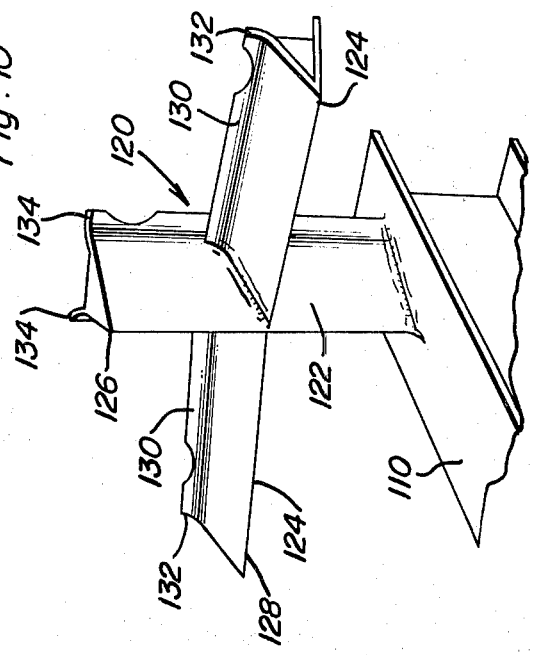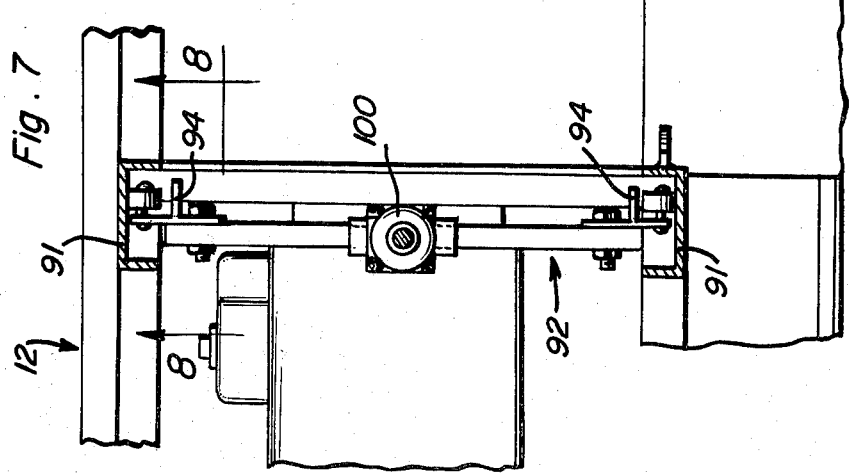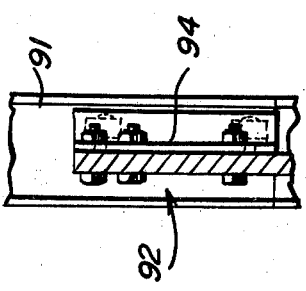

FIREPLACE WOOD CUTTING MACHINE

BACKGROUND OF THE INVENTION

When land is being cleared of trees whose wood is suitable for little more than fire wood, the cut trees are often cut into fire wood at the tree cutting site and shipped to area where fireplace wood may be marketed. However, there are few machines which are capable of handling relatively long logs and cutting those logs into fireplace wood.

Although various machines have been designed for felling trees by a shearing action and various structures have been provided for cutting short log lengths into log sections of fireplace length and thereafter splitting the short log sections into multiple fireplace log pieces, little attention has been given to the concept of providing an apparatus which may be readily transported to a land clearing site and utilized to efficiently cut full length tree logs into fireplace wood.

Examples of log cutting and splitting devices which have been previously designed are disclosed in U.S. Pat. Nos. 705,659, 1,307,714, 1,441,996, 2,087,321, 2,704,093, 3,242,955, 3,542,100 and 3,862,651.

BRIEF DESCRIPTION OF THE INVENTION

The fireplace wood cutting machine of the instant invention is constructed so as to be as portable in the manner of a trailer and readily rendered rendered operable at a tree cutting site. The machine includes a winch having a drag cable thereon approximately 500 feet in length for dragging cut tree logs to the machine. The machine includes an inclined loading conveyor whereby logs which have been dragged to the machine may be conveyed up onto the machine and a shear structure is provided for cutting predetermined length end portions from a tree log being advanced upwardly along the loading conveyor. In addition, the machine includes a trough for gravity receiving cut portions of tree logs and one end of the trough is provided with stationary wedge structure against which cut log sections may be forced by means of a hydraulic ram operatively associated with the trough. As the tree log sections are split by the wedge structure, they fall into the lower end of a discharge conveyor upwardly along which they are conveyed to an elevated position for discharge by gravity into a suitable transport.

The main object of this invention is to provide a machine which will be capable of cutting full length tree logs into fireplace wood as a result of a single pass of the wood of a tree log through the machine.

Another object of this invention is to provide a machine in accordance with the preceding objects and constructed in the form of a trailer whereby the machine may be readily trailed from one tree cutting operation to another.

A still further object of this invention is to provide a machine in accordance with the preceding objects which will be capable of handling logs of any length and shape.

A further object of this invention is to provide a machine which will be capable of dragging cut tree logs toward the machine from distances as great as 500 feet from the machine.

Another very important object of this invention is to provide a machine which will be capable of being operated in an efficient manner by a single operator.

A final object of this invention to be specifically enumerated herein is the provide a machine in accordance with the preceding objects and which will conform to conventional forms of manufacture, be a simple construction and easy to operate so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the fireplace wood cutting machine of the instant invention;

FIG. 2 is a side elevational view of the assemblage illustrated in FIG. 1;

FIG. 3 is an enlarged end elevational view of the discharge end of the machine with the discharge conveyor thereof removed;

FIG. 4 is an enlarged elevational view of the inlet end of the machine;

FIG. 5 is an enlarged fragmentary, longitudinal, vertical sectional view of the machine illustrating the loading conveyor, the shear structure, the log sections splitting structure and the inlet end of the discharge conveyor;

FIG. 6 is a fragmentary, horizontal sectional view taken substantially upon the plane indicated by the section line 6—6 of FIG. 5;

FIG. 7 is an enlarged fragmentary, horizontal, sectional view taken substantially upon the plane indicated by the section line 7—7 of FIG. 1;

FIG. 8 is a fragmentary, vertical, sectional view taken substantially upon the plane indicated by the section line 8—8 of FIG. 7;

FIG. 9 is a fragmentary, transverse, vertical, sectional view taken substantially upon the plane indicated by the section line 9—9 of FIG. 5;

FIG. 10 is a fragmentary, perspective view illustrating the cut tree log splitting wedge structure of the machine;

FIG. 11 is a fragmentary perspective view illustrating the power generating structure of the machine;

FIG. 12 is a fragmentary perspective view illustrating the drag cable winch assembly of the machine;

FIG. 13 is a fragmentary perspective view illustrating the traveling overhead log cradling winch structure of the machine; and FIG. 14 is a fragmentary perspective view of the discharge end of the discharge conveyor.

DETAILED DESCRIPTION OF THE INVENTION

Referring now more specifically to the drawings, the numeral 10 generally designates the fireplace wood cutting machine of the instant invention. The machine 10 includes a main frame 12 from which underslung tandem axle assemblies 14 are supported and the frame includes upper and lower portions referred to in general by the reference numerals 16 and 18, the axle assemblies 14 being spring supported from the lower section 18.

The frame 12 includes a forward end including a depending portion 20 from which an inclined loading ramp 22 is pivotally supported as at 24 for swinging movement between a downwardly and outwardly inclined operative position and an inoperative upstanding position projecting upwardly from the lower end of the depending portion 20. The frame 12 additionally includes a towing tongue 26 pivotally supported from the forward end of the frame 12 as at 28 and which may be swung downwardly from a substantially upstanding position, such as that illustrated in phantom lines in FIG. 2, to a horizontally and forwardly projecting operative position in which the tongue 26 may be anchored by means of a cable bridle 30.

The lower section 18 of the frame 12 supports a prime mover or engine 32 driving a transmission 34 through a clutch assembly and the transmission 34 drives a drive shaft 36 coupled to the input shaft 38 of a pump 40. The frame 12 additionally includes a clutch lever 42 which is operatively connected to the aforementioned clutch assembly for disengaging the engine 32 from the transmission 34. A fuel tank 44 is suspended beneath the frame 12 and the pump 40 includes an inlet 46 to which the discharge end of a fluid line 48 is coupled and an outlet 50 to which the inlet end of a high pressure line 52 is coupled. Further, an upstanding oil tank 54 is supported from the frame 12 and the supply line 48 extends from a lower portion of the tank 54 to the inlet 46.

The high pressure line 52 extends to a console 56 mounted on the frame 12 and the console 56 includes various controls, pressure relief valves and flow proportioning valves (not shown) for communicating the high pressure line 52 with various fluid motors to be hereinafter described. Of course, the oil being discharged from the various fluid motors to be later described is returned to the oil tank 54 through a return line 58 including filters 60 operatively associated therewith.

A winch assembly referred to in general by the reference numeral 62 is supported from the upper section 16 of the frame 12 and powered by a reversible hydraulic motor 64 driving the winch assembly 62 through a reduction assembly 66. In addition, the upper section 16 of the frame 12 includes a longitudinal beam 68 upon which a traveling winch assembly referred to in general by the reference numeral 70 is mounted for movement therealong. The winch assembly 70 includes a fluid motor 72 for driving the winch assmebly 70 along the beam 68 and a second motor of the reversible type for driving the winding drum 74 of the winch assembly 70.

The winch assembly 70 has a relatively short cable 76 anchored to its winding drum 74 and the cable 76 may be anchored about a log being advanced to the shear mechanism of the machine 10 for elevating that log in the event the log is curved and may not be otherwise properly fitted into the shear mechanism. The winding drum 78 of the winch assembly 62, on the other hand, has a relatively long cable 80 mounted thereon. The cable 80 may be approximately 500 feet in length and is utilized to drag tree logs toward the machine 10.

The forward end of the machine 10 includes an inclined endless loading conveyor 82 driven by a hydraulic motor 84 through a gear reduction assembly 86 and the conveyor 82 has a pair of trough defining side boards 88 operatively associated therewith. The lower end of the conveyor 82 is positioned to engage a log 90 which has been dragged toward the front end of the machine 10 by means of the cable 80 and upwardly deflected by the loading ramp 22. After the log 90 has been engaged by the conveyor 82 and pulled up onto the latter by means of the cable 80, the conveyor 82 is operative to feed the log 90 upwardly along the conveyor 82.

The frame 12 includes a pair of upstanding opposite side guides 91 from which a vertically reciprocal blade assembly 92 is guidingly supported. The blade assembly 92 includes roller followers 94 rollingly engaged with the guides 91 and the blade assembly 92 includes a vertical blade member 96 from which the roller followers 94 are supported and the lower end of a piston rod assembly 98 of a hydraulic cylinder assembly 100 dependingly supported from the upper section 16 is connected to the upper marginal portion of the vertical blade member 96. The vertical blade member 96 includes a downwardly concave arcuate sharpened edge 102 and the lower portion or section 18 of the frame 12 supports an upwardly opening arcuate cradle plate 104 with which the blade member 96 is cooperable to shear an end section from the log 90 disposed between the blade 96 and the cradle 104.

As hereinbefore set forth, if the log 90 is crooked it may be necessary to elevate that portion of the log 90 projecting from the front end of the machine 10. The elevation of the log 90 in this manner may be carried out through the utilization of the traveling winch assembly 70 and the cable 76 carried by the winch drum 74 thereof, see FIG. 13.

The rear end of the frame 12 defines a trough assembly referred to in general by the reference numeral 106 including a pair of inclined opposite side panels 108. The lower end of the trough assembly 106 is defined by a structural beam 110 extending longitudinally of the transverse central portion of the rear end of the frame 12 and a guide follower assembly referred to in general by the reference numeral 112 is mounted on the structural beam 110 for movement therealong and supports a heavy gauge pressure plate 114 therefrom. The free end of the piston rod 116 of a horizontally disposed double acting fluid cylinder 118 is anchored to the pressure plate 114 and the cylinder 118 is anchored to the lower section 18 of the main frame 12 beneath the discharge end of the conveyor 82. As cut ends are discharged after being sheared from the log 90 by the blade assembly 92 coacting with the cradle 104, they fall down into the trough assembly 106 to the rear of the forwardly retracted pressure plate 114. Then, the hydraulic cyclinder 118 is actuated and the pressure plate 114 is rearwardly advanced and engaged with the cut log end disposed in the trough assembly 106 in order to urge the cut log end rearwardly into engagement with a wedge assembly 120 carried by the rear end of the structural beam 110.

The wedge assembly 120 includes an upstanding wedge blade 122 and horizontally outwardly projecting opposite side wedge blades 124 supported from and projecting outwardly from opposite sides of the vertical mid portion of the wedge blade 122.

The wedge blade 122 is V-shaped in horizontal section and positioned with its apex 126 facing forwardingly toward the pressure plate 114. The wedge blades 124 are V-shaped in longitudinal vertical section and disposed with their apices 128 also facing toward pressure plate 114.

The wedge blades 124 define a forwardly opening included angle therebetween of less that 180° and the upper rear marginal edge portions 130 thereof are upwardly flared as at 132. Further, that portion of the wedge blade 122 disposed above the wedge blades 124 include outwardly flared rear marginal edge portions 134.

A discharge conveyor is provided and referred to in general by the reference numeral 136. The discharge conveyor 136 includes a frame 138 from which a single wheeled transverse axle assembly 140 is supported and the inlet end of the discharge conveyor includes support brackets 142 which are removably engageable over a transverse support shaft 144 carried by the rear end of the lower section 18 of the frame 12, see FIG. 5. The discharge conveyor 136 includes an elongated endless flexible conveyor element 146 driven by a fluid motor 148 drivingly coupled to the endless conveyor element 146 through a reduction gear assembly 150. The reduction gear assembly 150 and motor 148 are carried by the discharge end of the discharge conveyor remote from the brackets 142 and the discharge end of the discharge conveyor 136 includes a trailer hitch assembly 152 by which the discharge conveyor 136 may also be trailed from one location to another in the manner of a trailer.

When it is desired to attach the discharge conveyor 136 to the rear end of the frame 12 of the machine 10, the brackets 142 are engaged over the support shaft 144 and the discharge end of the conveyor 136 is elevated through the utilization of the cable 80 passed through a fair-lead 160 carried by the upper section 16 of the frame 12. After the discharge conveyor 136 has been elevated to the position thereof illustrated in FIG. 2 of the drawings by means of the cable 80 with the conveyor 136 totally supported from the frame 12, an anchor cable 162 is utilized to maintain the conveyor 136 in the operative position thereof illustrated in FIG. 2. Of course, the motor 48 may also be actuated from the console 56. Further, the fluid motors 118, 100, 84, 72, 64 and the hydraulic motor powering the winding drum 74 may all be actuated as desired from the console 56.

In operation, after the machine 10 and discharge conveyor 136 have been trailed to a tree felling location, the tongue 26 is swung to the upstanding phantom-line postion thereof illustrated in FIG. 2 and secured in that position. Thereafter, the loading ramp 22 may be lowered to the operative position thereof illustrated in FIG. 2 and the discharge conveyor 136 may be supported from the rear end of the frame 12 in the manner immediately above described. Thereafter, a tree felled to the ground as far as 500 feet distant from the machine 10 may have the cable 80 attached thereto and the winch assembly 62 may be utilized to drag the tree log toward the loading ramp. After the adjacent end of the log 90 engages the loading ramp 22 and is upwardly deflected thereby, the leading end of the log 90 is engaged by and conveyed further upwardly by the conveyor 82. When the leading end of the log has been positioned past the shear assembly defined by the blade member 96 and the cradle 104, further advancement of the log 90 is terminated for the duration of operation of the shearing mechanism by the hydraulic cylinder 100 being actuated to urge the blade member 96 down onto the log in order to shear the leading end thereof from the remainder of the log. Thereafter, the blade member 96 is again upwardly retracted. As soon as the leading end portion of the log 90 has been cut from the remaining portion thereof, the cut portion falls down into the trough assembly 106 and the hydraulic cylinder 118 is actuated in order to force the cut end portion of the log into engagement with the wedge assembly 120 whereby the latter will split the cut end portion of the log into quarter log segments. These quarter log segments then fall down into the inlet end of the discharge conveyor 136 and are conveyed upwardly therealong by means of the endless conveyor element 146 for discharging from the upper elevated end of the discharge conveyor 136 into a suitable receptacle 170 for transport from the tree felling location to a market place for the fireplace wood. During operation of the hydraulic cylinder 118, the conveyor 82 may again be actuated to advance the log 90 into position to have the next end section cut therefrom through the coaction between the blade member 96 and the cradle 104. As soon as the piston rod 116 of the cylinder 118 has been fully retracted, the hydraulic cylinder 100 may be again actuated in order to shear the next end portion from the log 90 for falling downwardly by gravity into the trough assembly 106 and preparatory to that next log end section being split.

Because the wedge blades 124 define a rearwardly opening included angle of less than 180°, the opposite side portions of the log to be split are first split. The outwardly flared portions 130 and 134 of the wedge blades 124 and 122 insure that the log portion being split is quickly split into its quarter segments. In addition, that portion of the wedge blade 122 disposed below the wedge blades 124 does not include the outwardly flared portions of the marginal edge portions 134 inasmuch as the provision of such outwardly flared portions on the lower end of the wedge blade 122 would cause binding and require excessive force to effect proper spliting of a log end discharged downwardly into the trough assembly 106.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an elongated support frame including inlet and outlet ends, said inlet end including an inclined loading conveyor with its lower end remote from said outlet end, drag cable winch means carried by an upper portion of said support frame and having a drag cable mounted thereon for winching logs lengthwise toward said conveyor from outwardly of said inlet end, shear means mounted on said frame adjacent the upper end of said conveyor for shearing log end portions being discharged from the upper end of said conveyor, elongated trough means supported from said frame and including one end for receiving log end portions from said shear means, force means for engaging and forcing a log end in said one end toward the other end of said trough means against which a cut log end forced along said trough means by said force means may be forced for splitting said cut log end into multiple log sections, said upper portions of said frame including longitudinally extending support track means, a traveling overhead winch assembly movably mounted on said track means movement therealong, said overhead winch assembly including lift cable means for engagement with and elevating the mid portion of a log supported from said loading conveyor.

2. In combination, an elongated support frame including inlet and outlet ends, said inlet end including an inclined loading conveyor with its lower end remote from said outlet end, drag cable winch means carried by an upper portion of said support frame and having a drag cable mounted thereon for winching logs lengthwise toward said conveyor from outwardly of said inlet end, shear means mounted on said frame adjacent the upper end of said conveyor for shearing log end portions being discharged from the upper end of said conveyor, elongated trough means supported from said frame and including one end for receiving log end portions from said shear means, force means for engaging and forcing a log end in said one end toward the other end of said trough means against which a cut log end forced along said trough means by said force means may be forced for splitting said cut log end into multiple log sections, said shear means including an upwardly opening arcuate transverse cradle plate mounted on said frame for supporting and aligning a log to be sheared and a single downwardly facing transverse shearing blade supported from said frame for vertical shifting relative to said cradle plate in shearing relation therewith, and fluid cyclinder drive means connected between said frame and shearing blade operative to selectively vertically shift said shearing blade.

3. The combination of claim 1 wherein said frame includes rear end portion support wheels and a front end towing tongue for releasable coupling to a towing vehicle.

4. The combination of claim 1 including an inclined discharge conveyor operatively associated with said frame and having its lower inlet end positioned to receiving split log sections from said wedge means.

5. The combination of claim 1 wherein said wedge means includes a cruciform wedge structure facing toward said one end of said trough means.

6. The combination of claim 5 wherein said cruciform wedge means includes an elongated upright wedge member of generally V-shape in horizontal section with its apex facing toward said one end of said trough means and a pair of horizontal elongated wedge members of generally V-shape in vertical section with their apices facing toward said one end of said trough means, said pair of wedge members being supported from and projecting horizontally outwardly from opposite side portions of the upright wedge member centrally intermediate its upper and lower ends.

7. The combination of claim 6 wherein said frame includes an elongated horizontal structural member defining the lower central longitudinally extending portion of said trough means, the lower portion of said upright wedge member being supported from said structural member.

8. The combination of claim 7 wherein said force means includes a pressure plate supported from said structural member for guided movement therealong.

9. The combination of claim 8 wherein said force means includes a fluid cylinder connected between said frame and said pressure plate.

10. The combination of claim 6 wherein the marginal edge of the sides of said upright wedge member above said horizontal wedge member and remote from said apex are outwardly flared.

11. The combination of claim 10 wherein the marginal edges of the upper sides of said horizontal wedge members remote from said apices are upwardly flared.

12. An apparatus for splitting short tree log lengths into fireplace wood, said apparatus including through means defining an elongated upwardly opening trough including one end for receiving short log lengths, force means for engaging and forcing a log end in said one end toward the other end of said trough means and stationary wedge means adjacent the other end of said trough means against which a cut log end forced along said trough means by said force means may be forced for splitting said cut log end into multiple log sections, said wedge means including cruciform wedge structure facing toward said one end of said trough means and including an elongated upright wedge member of generally V-shape in horizontal section with its apex facing toward said one end of said trough means and a pair of horizontal elongated wedge members of generally V-shape in vertical section with their apices facing toward said one end of said trough means, said pair of wedge members being supported from and projecting horizontally outwardly from opposite side portions of the upright wedge member centrally intermediate its upper and lower ends, the apices of said horizontal wedge members being generally straight throughout substantially the full length of said horizontal wedge members and defining an included angle of less than 180° open toward said force means, at least all but the ends of said horizontal wedge member apices adjacent said upright wedge member projecting outwardly beyond said apex of said upright wedge member toward said one end of said trough means, whereby the outer ends of the apices of said horizontal wedge members will first engage opposite side outer peripheral portions of a log to be split.

13. The combination of claim 12 wherein said apparatus includes an elongated horizontal structural member defining the lower central longitudinally extending portion of said trough means, the lower portion of said upright wedge member being supported from said structural member.

14. The combination of claim 13 wherein said force means includes a pressure plate supported from said structural member for guided movement therealong.

15. The combination of claim 14 wherein said force means includes a fluid cylinder connected between said structural member and said pressure plate.

16. The combination of claim 12 wherein the marginal edges of the sides of said upright wedge member above said horizontal wedge member and remote from said apex are outwardly flared.

* * * * *